US011059219B2

(12) United States Patent
Childers (10) Patent No.: US 11,059,219 B2
(45) Date of Patent: Jul. 13, 2021

(54) LARGE AREA THREE DIMENSIONAL PRINTER

(71) Applicant: 3D Systems, Inc., Rock Hill, SC (US)

(72) Inventor: Winthrop Childers, San Diego, CA (US)

(73) Assignee: 3D Systems, Inc., Rock Hill, SC (US)

( * ) Notice: Subject to any disclaimer, the term of this patent is extended or adjusted under 35 U.S.C. 154(b) by 144 days.

(21) Appl. No.: 16/523,172

(22) Filed: Jul. 26, 2019

(65) Prior Publication Data

US 2020/0039142 A1    Feb. 6, 2020

Related U.S. Application Data

(60) Provisional application No. 62/713,663, filed on Aug. 2, 2018.

(51) Int. Cl.

| | | |
|---|---|---|
| *B29C 64/129* | (2017.01) | |
| *B29C 64/255* | (2017.01) | |
| *B29C 64/245* | (2017.01) | |
| *B29C 64/379* | (2017.01) | |
| *B29C 64/264* | (2017.01) | |
| *B33Y 40/00* | (2020.01) | |
| *B33Y 10/00* | (2015.01) | |
| *B33Y 30/00* | (2015.01) | |

(52) U.S. Cl.
CPC .......... *B29C 64/129* (2017.08); *B29C 64/245* (2017.08); *B29C 64/255* (2017.08); *B29C 64/264* (2017.08); *B29C 64/379* (2017.08); *B33Y 10/00* (2014.12); *B33Y 30/00* (2014.12); *B33Y 40/00* (2014.12)

(58) Field of Classification Search
CPC .................................................. B29C 64/129
See application file for complete search history.

(56) References Cited

U.S. PATENT DOCUMENTS

| | | | | |
|---|---|---|---|---|
| 5,009,585 A | * | 4/1991 | Hirano ................... | B29C 64/135 425/174.4 |
| 5,171,490 A | * | 12/1992 | Fudim ................... | B29C 64/129 425/174.4 |
| 5,328,752 A | * | 7/1994 | Miyazato ............... | B29C 64/129 428/209 |
| 2016/0107340 A1 | * | 4/2016 | Joyce .................... | B29C 64/129 425/174.4 |
| 2017/0210071 A1 | * | 7/2017 | Wu ........................ | B29C 64/129 |

(Continued)

*Primary Examiner* — Timothy Kennedy (57) ABSTRACT

A system for manufacturing a three-dimensional article includes a resin vessel, a light engine, a support scaffold, and a positioning actuator. The resin vessel includes an opening closed by a transparent sheet with opposed upper and lower surfaces. The light engine is disposed below the transparent sheet and is configured to transmit or project radiation up through the transparent sheet for selectively curing layers of the resin over a build plane. The support scaffold includes at least one ridge having an upper surface that contacts the lower surface of the transparent sheet to reduce an unsupported width. At a first lateral position the scaffold blocks the radiation from reaching a first blocked region of the build plane. The positioning actuator is configured to laterally move the scaffold from the first position to a second position to allow radiation to reach the first blocked region of the build plane.

14 Claims, 7 Drawing Sheets

FIG. 1

(56) References Cited

U.S. PATENT DOCUMENTS

2018/0029296 A1\* 2/2018 Van Esbroeck ....... B29C 64/129
2019/0291342 A1\* 9/2019 Chen ..................... B29C 64/129
2020/0101715 A1\* 4/2020 Billiet ................... B29C 64/129

\* cited by examiner

LARGE AREA THREE DIMENSIONAL PRINTER

FIELD OF THE INVENTION

This non-provisional patent application claims priority to U.S. Provisional Application Ser. No. 62/713,663, Entitled "LARGE AREA THREE DIMENSIONAL PRINTER" by Winthrop Childers, filed on Aug. 2, 2018, incorporated herein by reference under the benefit of U.S.C. 119(e).

FIELD OF THE INVENTION

The present disclosure concerns an apparatus and method for fabrication of solid three-dimensional (3D) articles of manufacture from energy curable, light curable or photo-curable materials. More particularly, the present disclosure concerns a way of providing a large area printer while minimizing usage of photocurable resin relative to a volume of a three-dimensional article.

BACKGROUND

Three-dimensional printers are in wide use for manufacturing three-dimensional articles. Some three-dimensional printer designs are optimized for the use of photocurable materials. These materials are very expensive. There is a desire to minimize the amount of photocurable material required for printing. At the same time, there is a desire to provide printers that can print increasingly large articles.

SUMMARY

In a first aspect of the disclosure, a system for manufacturing a three-dimensional article includes a resin vessel, a light engine, a support scaffold, and a positioning actuator. The resin vessel includes an opening closed by a transparent sheet. The transparent sheet has opposed upper and lower surfaces. The upper surface is for contacting resin contained in the resin vessel. The light engine is disposed below the transparent sheet and is configured to transmit or project radiation up through the transparent sheet. The projected radiation is for selectively curing layers of the resin over a laterally extending build plane. The support scaffold includes at least one ridge having an upper surface that contacts or impinges upon the lower surface of the transparent sheet which reduces an unsupported dimension or width of the transparent sheet. At a first lateral position the scaffold blocks the radiation from reaching a first blocked region of the build plane while allowing the radiation to reach a first unblocked region of the build plane. The positioning actuator is configured to laterally move the scaffold from a first position to a second position to allow radiation to reach the first blocked region of the build plane.

In one implementation the system includes a movement mechanism for vertically positioning a support tray. The support tray has a lower surface for supporting the three-dimensional article. The support tray or the three-dimensional article defines a lower face which is in facing relation with the upper surface of the transparent sheet. The contact of the upper surface of the ridge with the lower surface of the transparent sheet helps to vertically support the upper surface of the transparent sheet proximate to the build plane. The ridge can include a vacuum port for engaging and holding down the transparent sheet. The ridge can include one or a plurality of ridges that support the transparent sheet. The ridge can have one more or of a number of lateral shapes including square, elongated rectangular, polygonal, circular, elliptical, and irregular to name a few examples.

In another implementation the system can include a controller that is controllably coupled to the light engine, the positioning actuator, and to a movement mechanism for vertically positioning a support tray. The controller can be configured to control the actuator to position the support scaffold at N different lateral positions during which the light engine selectively cures a layer of resin at the build plane. The controller can also be configured to control the light engine to generate N image subframes individually corresponding to the N different lateral positions of the support scaffold. The subframes complement one another to define the selectively cured layer of resin over the build plane. The value of N can be two. The value of N can also be greater than two.

In yet another implementation the transparent sheet has a high optical clarity and is permeable to an inhibitor. The transparent sheet can be formed from a Polytetrafluoroethylene (PTFE) which is permeable to oxygen. An example of such a PTFE material is Teflon® AF-2400 which is provided by Biogeneral. As the light engine images layers at the build plane, the inhibitor maintains a zone at the upper surface of the transparent sheet without polymerization.

In a second aspect of the disclosure, a system for manufacturing a three-dimensional article includes a resin vessel, a movement mechanism, a light engine, a support scaffold, a positioning actuator, and a controller. The resin vessel includes a lower opening closed by a transparent sheet. The transparent sheet has opposed upper and lower surfaces. The upper surface is for contacting and containing resin contained in the resin vessel. The movement mechanism is for positioning a support tray having a lower surface for supporting the three-dimensional article. The support tray or the three-dimensional article define a lower face. The light engine is disposed below the transparent sheet and is configured to selectively project radiation up through the transparent sheet to selectively cure layers of the resin over a build plane and onto the lower face. The support scaffold is configured to engage the lower surface of the transparent sheet to reduce an unsupported dimension or width of the transparent sheet. The support scaffold includes a light-blocking portion that laterally overlaps with the build plane. The positioning actuator is coupled to the support scaffold. The controller is configured to (a) operate the movement mechanism to position the lower face proximate to the build plane, (b) operate the positioning actuator to position the support scaffold at a first lateral position at which the light-blocking portion of the scaffold overlays a first blocked region of the build plane, (c) operate the light engine to generate a first image subframe that includes a first unimaged region that overlays the first blocked region of the build plane, (d) operate the positioning actuator to position the support scaffold at a second lateral position at which the light-blocking portion of the scaffold overlays a second blocked region of the build plane, (e) operate the light engine to generate a second subframe that includes a second unimaged region that overlays the second blocked region and also images at least a portion of the first unimaged region, and further operate the movement mechanism, the positioning actuator, and the light engine until the three-dimensional article is formed.

In one implementation the controller includes a processor coupled to an information storage device. The information storage device includes a non-volatile or non-transient storage device storing software instructions. The processor executes the software instructions to control various portions of the system including the movement mechanism, the light engine, and the positioning actuator. The controller can be physically located on one board or chip or it can be distributed among a plurality of boards and/or chips. The controller function can be collocated or located at various physical locations.

In another implementation the first blocked region is a single contiguous blocked region of the build plane. The first blocked region can take on any of a variety of lateral shapes including square, elongated rectangular, polygonal, circular, elliptical, or irregular to name a few examples. The first unimaged region overlays the first blocked region and can be larger to allow for alignment tolerances between the light engine and the scaffold position relative to the build plane.

In yet another implementation the first blocked region includes a first plurality of blocked regions that are not contiguous. The first plurality of blocked regions can include one or more lateral shapes including square, elongated rectangular, polygonal, circular, elliptical, and irregular to name a few examples. The first unimaged region overlays the first plurality of blocked regions and can be larger to allow for alignment tolerances between the light engine and the scaffold position relative to the build plane.

In a further implementation the second subframe images the entire first unimaged region. The second subframe and the first subframe have a sharp boundary or can have a degree of overlap. The first blocked region does not overlap with the second blocked region.

In a yet further implementation the light engine includes a plurality of projection light engines that individually define fields that collectively define the build plane. The fields can overlap along transition zones.

In another implementation the scaffold includes a ridge having an upper surface that engages the lower surface of the transparent sheet to maintain a proper spacing between the upper surface of the transparent sheet and the build plane. The upper surface of the ridge can include a vacuum port for engaging and holding down the transparent sheet. When the movement mechanism raises the lower face of the three-dimensional article away from the build plane, an upward force is exerted on the transparent sheet. The vacuum from the vacuum port can be used to help maintain a proper position and flatness of the transparent sheet.

In a third aspect of the disclosure a method of manufacturing a three-dimensional article includes (a) providing a resin vessel including an opening closed by a transparent sheet, (b) positioning a lower face of the three-dimensional article proximate to a build plane and in facing relation to the transparent sheet, (c) positioning a support scaffold at a first position at which a light-blocking portion of the scaffold overlays a first blocked region of the build plane, (d) selectively irradiating a first region of the build plane that does not include the first blocked region, (e) positioning the support scaffold at a second position at which the light-blocking portion of the scaffold overlays a second blocked region of the build plane, (f) selectively irradiating a second region of the build plane that does not include the second blocked region but does include at least a portion of the first blocked region, and (g) further positioning and irradiating until the three-dimensional article is formed.

DETAILED DESCRIPTION OF THE PREFERRED EMBODIMENTS

Figure 1:
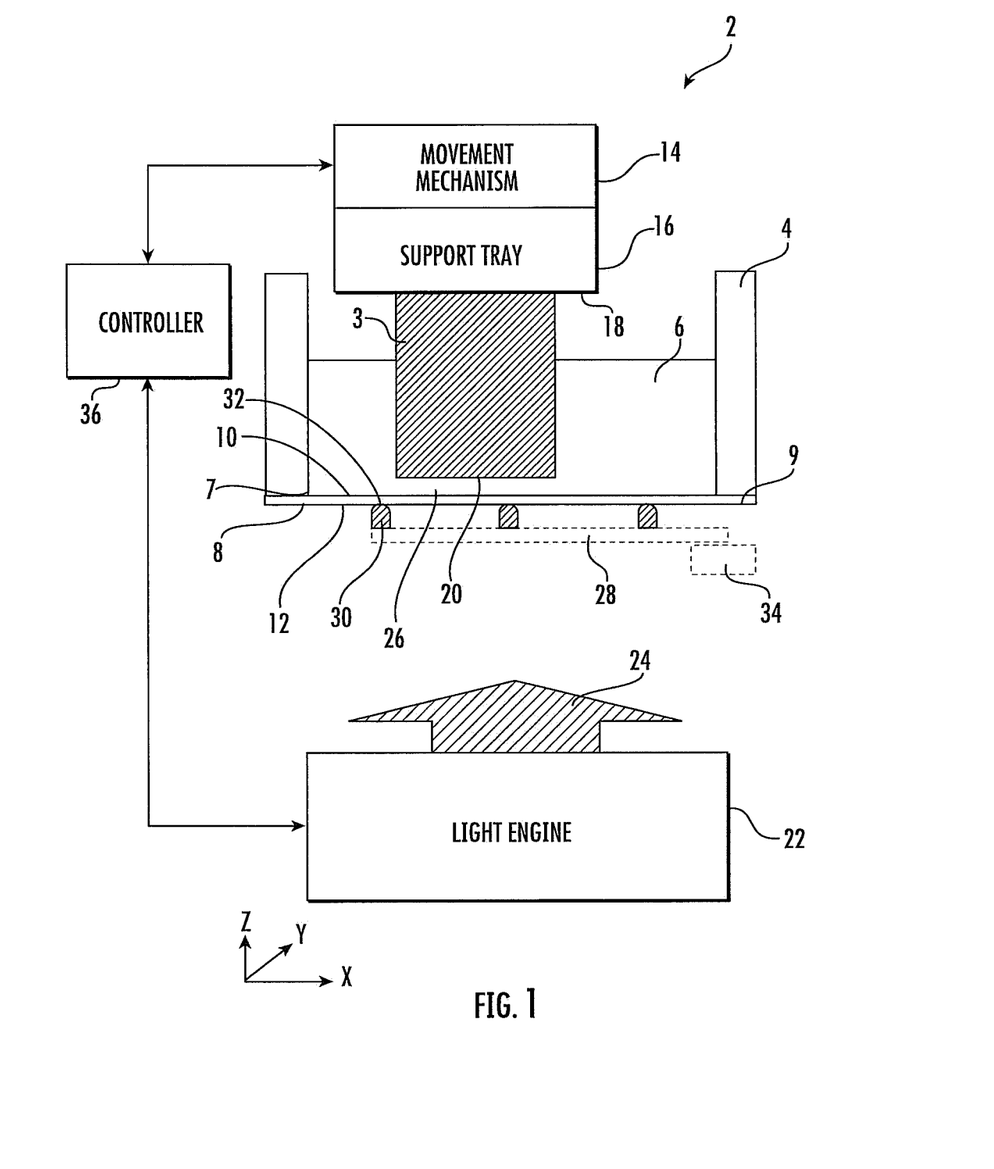
FIG. 1 is a schematic block diagram of an embodiment of a three-dimensional printing system for manufacturing a three-dimensional article.

FIG. 1 is a schematic block diagram of an embodiment of a three-dimensional printing system 2 for manufacturing a three-dimensional article 3. In describing the following figures, mutually perpendicular axes X, Y, and Z will be used. Axes X and Y are lateral axes that are horizontal or nearly horizontal. Axis Z is a vertical axis that is generally aligned with a gravitational reference. The direction +Z is generally upward and the direction −Z is generally downward.

The three dimensional printing system 2 includes a resin vessel 4 for containing a photocurable resin 6 including a lower opening 7 closed by a transparent sheet 8. The transparent sheet 8 has an upper surface 10 and an opposed lower surface 12. The upper surface 10 of the transparent sheet 8 is in contact with the resin 6.

In an illustrative embodiment, the transparent sheet 8 is supported along a support perimeter 9. The transparent sheet 8 has an unsupported area within and bounded by the support perimeter 9. The unsupported area is typically square or rectangular in shape although other shapes are possible. For a rectangular geometry, the width or minor axis of the rectangle is an important unsupported dimension. From here forward, we will refer to this dimension as the "unsupported width". It is desirable to keep the unsupported width below a certain threshold for a given thickness of the transparent sheet 8. For an ellipse, the unsupported width corresponds to a minor axis of the ellipse. For a circle, the unsupported width corresponds to a diameter of the circle. For a square, the unsupported width is the dimension of one side of the square.

A vertical movement mechanism 14 is configured to support and vertically translate a support tray 16. The support tray 16 has a lower surface 18 that supports the three-dimensional article 3. The lower surface 18 or a lower end of the three-dimensional article 3 defines a lower face 20 which is in facing relation with the upper surface 10 of the transparent sheet 8.

A light engine 22 is disposed below the resin vessel 4 and is configured to transmit pixelated light 24 to a build plane 26 which is proximate to the lower face 20. The pixelated light 24 selectively solidifies layers of the photocurable resin 6 at the build plane and accretive to the lower face 20. Oxygen that diffuses through the transparent sheet acts as an inhibitor that prevents resin from accreting onto the upper surface 10 of the transparent sheet 8.

In an illustrative embodiment, the light engine 22 includes a light source and a spatial light modulator. In a particular embodiment, the light engine 22 is a digital light projector system that projects pixelated ultraviolet (UV), violet, and/or blue light to the build plane 26. In this particular embodiment, the spatial light modulator includes a micromirror array of more than a million mirror elements.

In another embodiment, the light engine 22 includes a linear array of light sources that extends along axis Y and scans along axis X. In yet another embodiment, the light engine 22 includes a liquid crystal display light modulator and a blue light source. Other embodiments are possible for the light engine 22.

A support scaffold 28 is disposed below the transparent sheet 8. The support scaffold 28 includes at least one ridge 30 having an upper surface 32. The upper surface 32 of ridge 30 contacts the lower surface 12 of the transparent sheet 8 to reduce the unsupported width of the transparent sheet 8. An actuator 34 is coupled to the scaffold 28. The actuator 34 is configured to move and position the scaffold 28 and ridges 30 to different lateral positions to allow the light engine 22 to reach the entire build plane 26.

A controller 36 is coupled to the movement mechanism 14, the light engine 22, the actuator 34 and other portions of the three-dimensional printing system 2. The controller 36 includes a processor coupled to an information storage device. The information storage device includes a non-transient or non-volatile information storage device that stores software instructions. When executed by the processor, the software instructions operate the movement mechanism 14, the light engine 22, the actuator 34 and other portions of the three-dimensional printing system 2. The controller 36 can be contained in a single module or distributed among multiple modules that are internal and/or external to the three-dimensional printing system 2.

Figure 2:
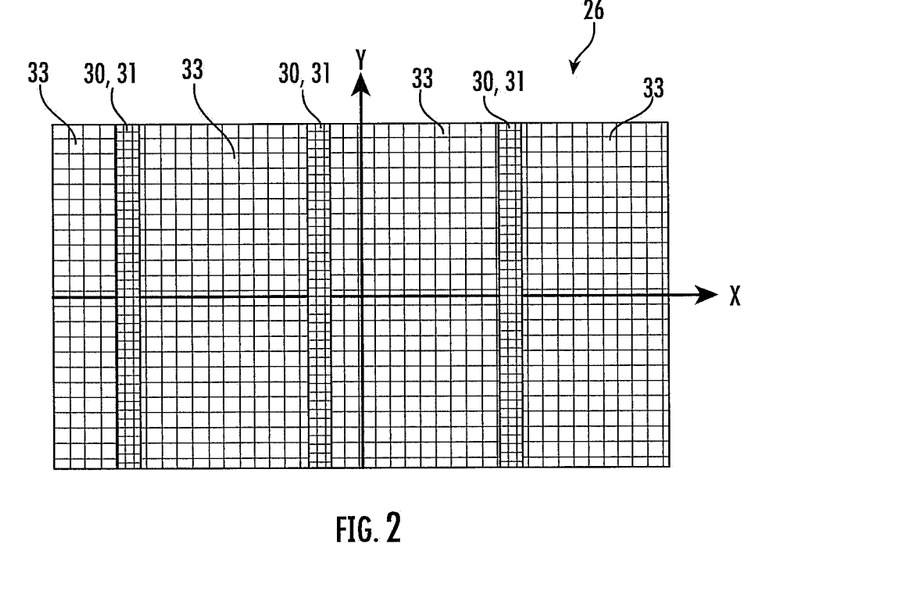
FIG. 2 is an illustration of some elements of a three-dimensional printing system that superposes portions of a support scaffold and a build plane.

FIG. 2 is an illustration of a lateral positioning of some elements of the printing system 2 including the laterally extending build plane 26 and the ridges 30 when the scaffold 28 is in a left (first) position. In the illustrated embodiment, the transparent film 8 is supported by three ridges 30 that correspond to light blocking portions of the scaffold 28. The light blocking portions of the scaffold 28 define first blocked regions 31 of the build plane 26. The ridges 30 individually are rectangular ridges that extend along Y for a given value of X. The ridges 30 laterally cast shadows upon the build plane 26 that prevent or block light from the light engine 22 from reaching lateral portions of the build plane 26 corresponding to light blocking portions of the scaffold 28. Between or outside of the light blocking portions of scaffold 28 are first open or unblocked regions 33 of the build plane 26.

Figure 3:
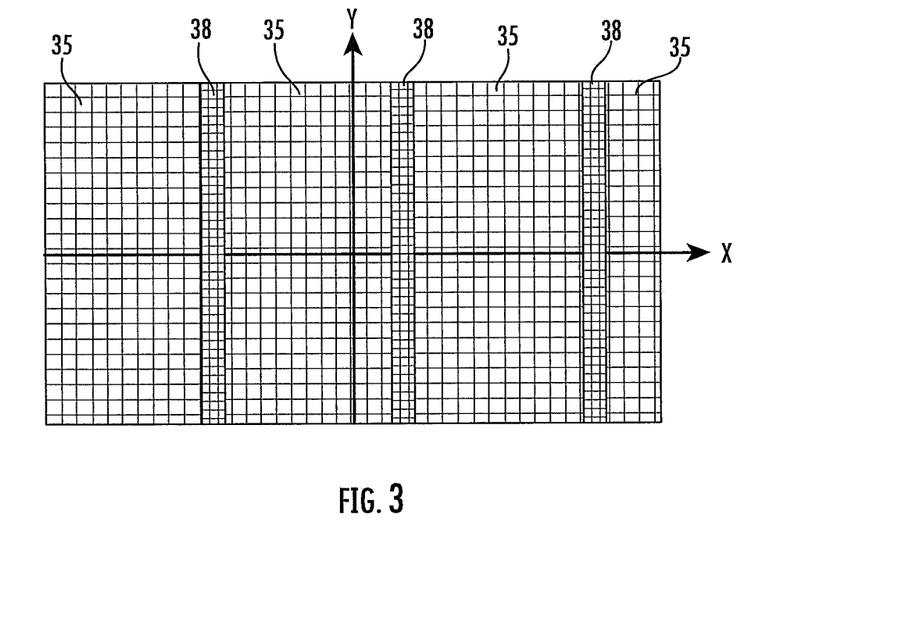
FIG. 3 is similar to FIG. 2 except that the scaffold has been shifted in physical location relative to the build plane.

FIG. 3 is similar to FIG. 2 except that the scaffold 28 has been shifted to a right (second) position. Second unblocked or open regions 35 in the right position overlay the previously blocked regions 31 in the left position. Likewise, the blocked regions 37 in the right position are overlaid by the open regions 33 of the left position. Therefore, the light engine 22 can image the entire build plane 26 with two image subframes including a first image subframe that images open regions 33 when the scaffold 28 is in the left (first) position and then a second image subframe that images the open regions 35 when the scaffold 28 is in the right (second) position.

Figure 4:
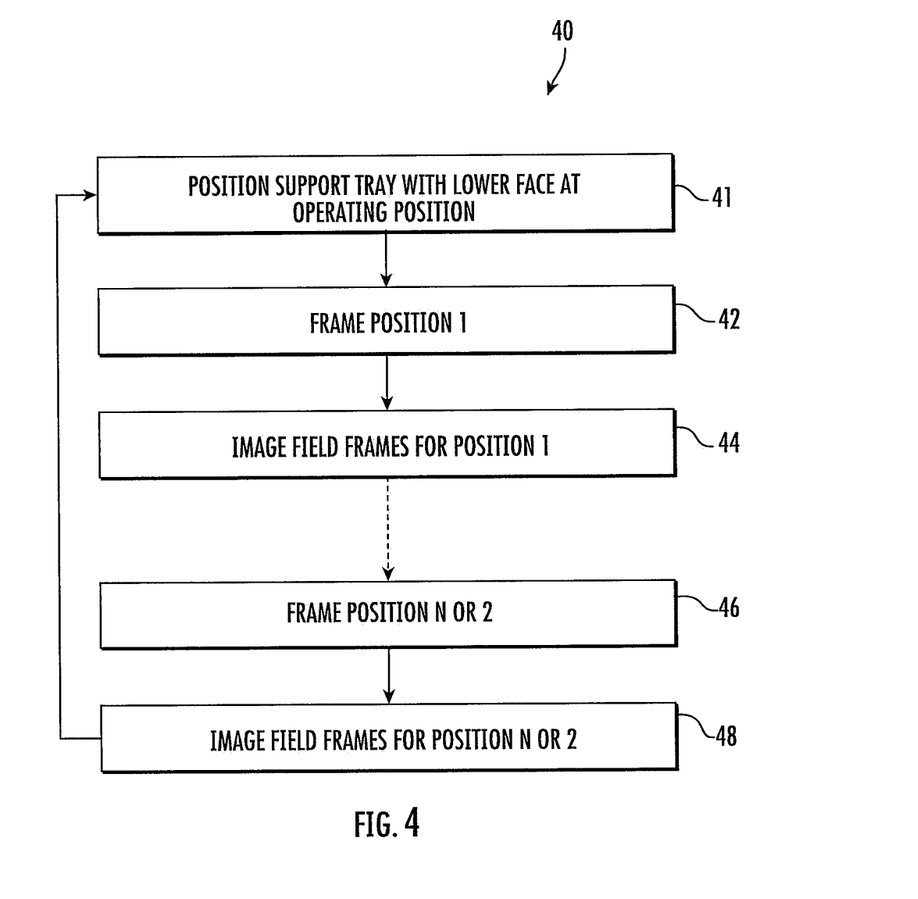
FIG. 4 is a flowchart depicting an embodiment of a method for operating a three-dimensional printing system.

FIG. 4 is a flowchart depicting an embodiment of a method 40 for operating the three-dimensional printing system 2. In an illustrative embodiment, method 40 is performed by the controller 36.

According to 41, the movement mechanism 14 is operated to position the lower face 20 (initially the lower surface 18 of the support tray 16) proximate to the build plane 26. According to 42-48 the controller 36 operates the actuator 34 and light engine 22 to generate image N subframes, with individual image subframes corresponding to defined positions of the scaffold 28. For some embodiments, N equals 2. For other embodiments, N is greater than 2.

According to 42, the positioning actuator 34 is operated to position the scaffold 28 at a first lateral position at which a light-blocking portion of the scaffold 28 overlays a first blocked region 31 of the build plane 26.

According to 44, the light engine 22 is operated to generate a first image subframe. The first image subframe includes a first unimaged region that overlays the first blocked region 31 of the build plane. The first image subframe also includes a first imaged region 33. An unimaged region receives no radiation. An imaged region selectively receives radiation.

According to 46, the positioning actuator 34 is operated to position the scaffold 28 at a second lateral position at which the light-blocking portion of the scaffold overlays a second blocked region 38 of the build plane 26.

According to 48, the light engine is operated to generate a second subframe. The second subframe includes a second unimaged region that overlays the second blocked region 38 of the build plane 26. The second subframe also includes a second imaged region 35 that at least partially overlays the first unimaged region 31 of the build plane 26.

Steps 41-48 are repeated until a three-dimensional article 3 is fully formed or defined. In some embodiments, the scaffold 28 has a plurality of light blocking portions that overlays a corresponding plurality of blocked regions 31 or 38 of the build plane 26.

In an illustrative embodiment N=2. An example in which N=2 was illustrated with respect to FIGS. 2 and 3 and is also illustrated below with respect to FIGS. 5-9.

Figure 5:
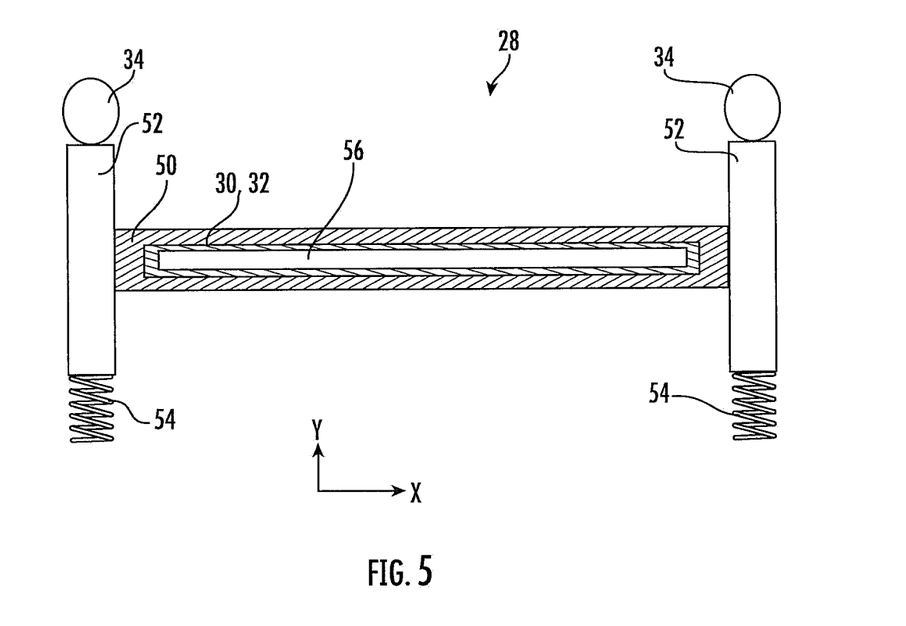
FIG. 5 is a top view of an embodiment of a support scaffold.
Figure 6:
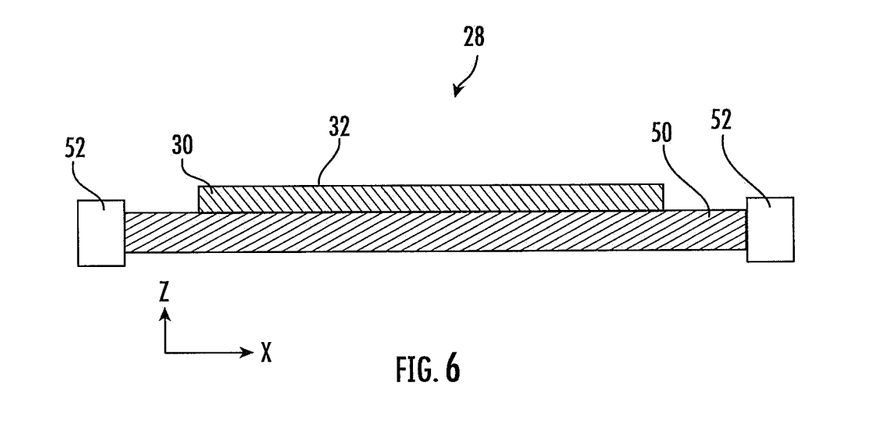
FIG. 6 is a side view of the support scaffold of FIG. 5.

FIG. 5 is top view and FIG. 6 is a side view of an illustrative embodiment of a support scaffold 28 for supporting the transparent sheet 8. Support scaffold 28 includes a lateral beam 50 that extends along the X-axis between two movement guides 52. The movement guides 52 constrain the lateral beam 50 to movement along the Y-axis without any angular movement. The scaffold 28 has two positions with respect to the Y-axis which will be illustrated infra. A spring 54 engages and urges the scaffold 28 in the +Y direction. Actuator 34 operates to toggle between the two positions of the scaffold 28. In one embodiment, the actuator 34 is a motorized cam with two positions that define two Y-locations for the support scaffold 28.

The lateral beam 50 supports ridge 30 with upper surface 32. Disposed within the upper surface 32 is a port or opening 56. Port 56 functions as a vacuum port 56 for applying a suction to the lower surface 12 of the transparent sheet 8. When the support tray 16 is moving upwards, the motion applies an upward force on the transparent sheet 8. The vacuum force of the vacuum port 56 upon the lower surface 12 of the transparent sheet 8 can resist this upward force and maintain a flatness of the transparent sheet 8.

Figure 7:
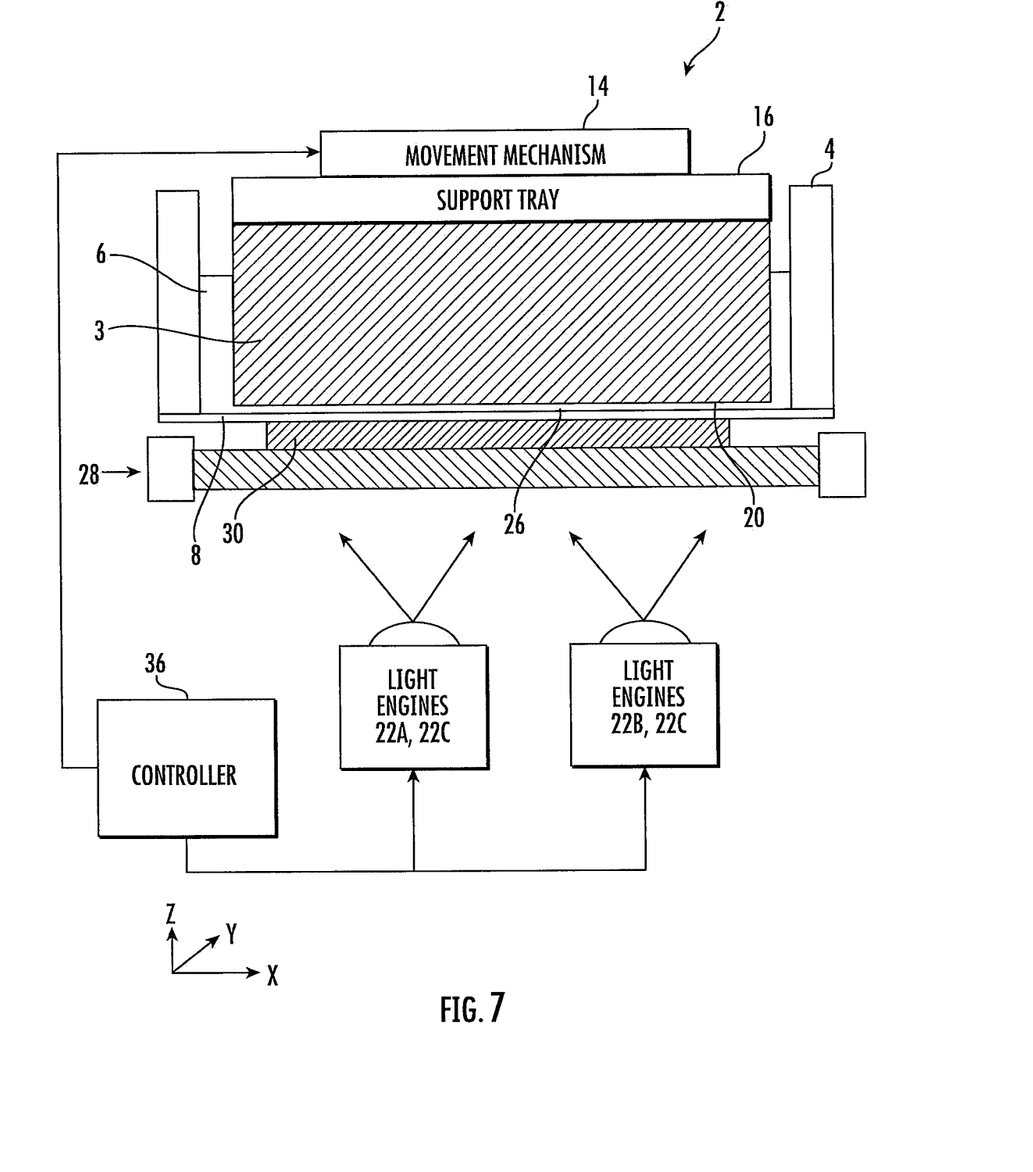
FIG. 7 is a side view of a three-dimensional printing system having four projection light engines and that utilizes the support scaffold of FIGS. 5 and 6.

FIG. 7 is a schematic illustration of a three-dimensional printer 2 that utilizes four projection light engines 22A, 22B, 22C, and 22D (that collectively define a light engine 22). Other elements are similar to those discussed with respect to FIG. 1 except as noted. The illustrated support scaffold 28 is similar to that described with respect to FIGS. 5 and 6. The upper surface 32 of ridge 30 provides support for the transparent sheet 8. A vacuum port opening 56 (FIG. 5) also holds the transparent sheet down onto the surface 32. The vacuum is released while the actuator 34 moves the support scaffold between positions along the Y-axis.

Figure 8:
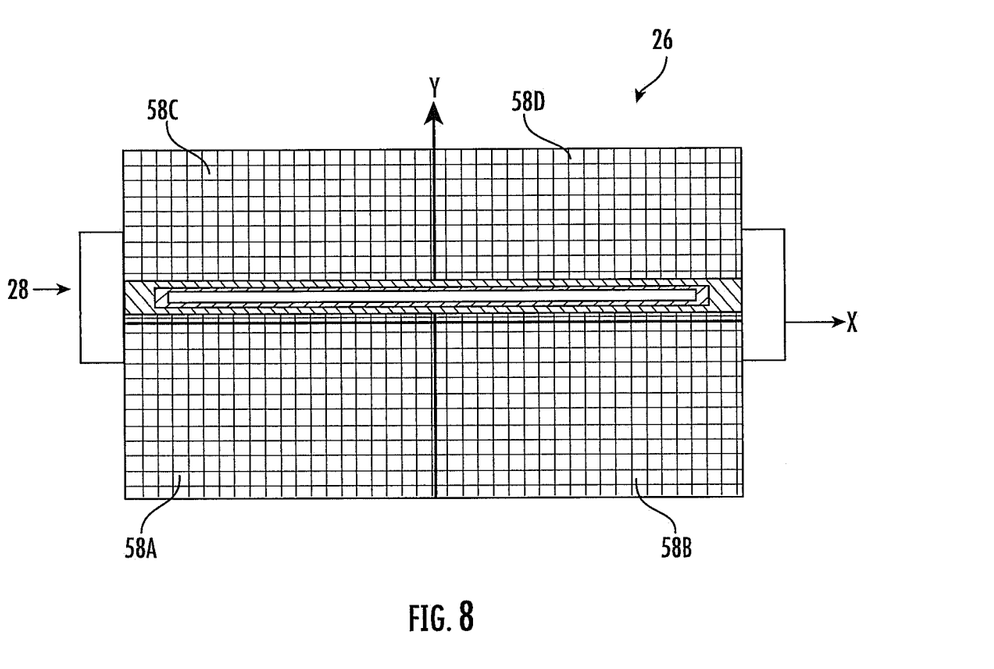
FIG. 8 is an illustration of a build plane defined by the three-dimensional printing system of FIG. 7 superposed with a first position of the support scaffold.
Figure 9:
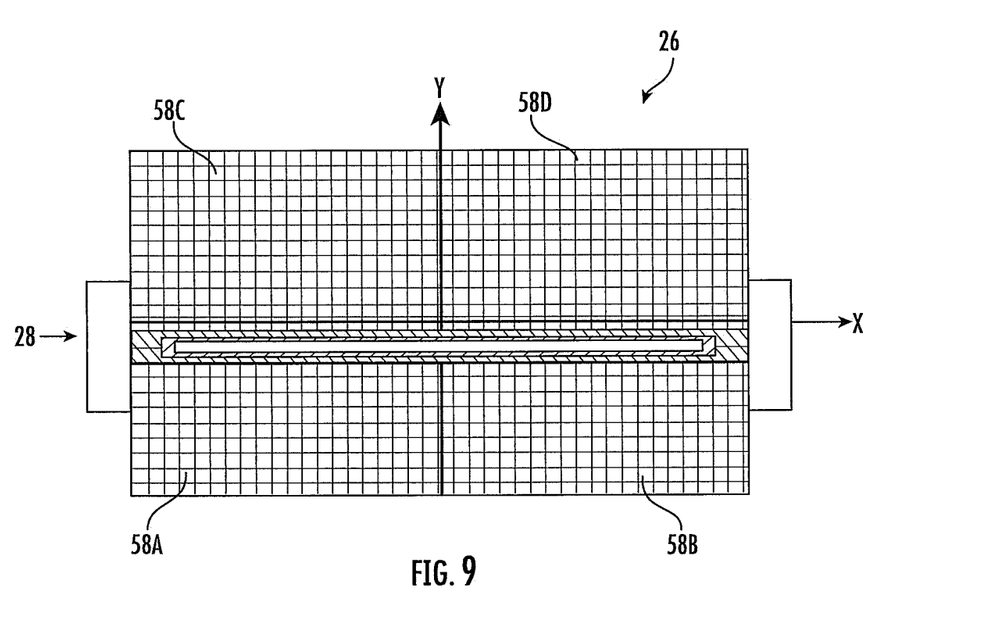
FIG. 9 is similar to FIG. 8 except that the support scaffold has been laterally shifted to a second position.

FIGS. 8 and 9 depict the build plane 26 defined by the four light engines 22A-D of FIG. 7. The light engines 22A-D define four build fields including build field 58A defined by light engine 22A, build field 58B defined by light engine 22B, build field 58C defined by light engine 22C, and build field 58D defined by light engine 22D.

FIGS. 8 and 9 also illustrate first and second positions of the support scaffold 28 respectively. The first position (FIG. 8) can also be referred to as the +Y position of the support scaffold 28. The second position (FIG. 9) can also be referred to as the -Y position of the support scaffold 28. In the first position, the support scaffold 28 blocks part of the 58C and 85D fields. In the second position, the support scaffold blocks part of the 58A and 58B fields.

Figure 10:
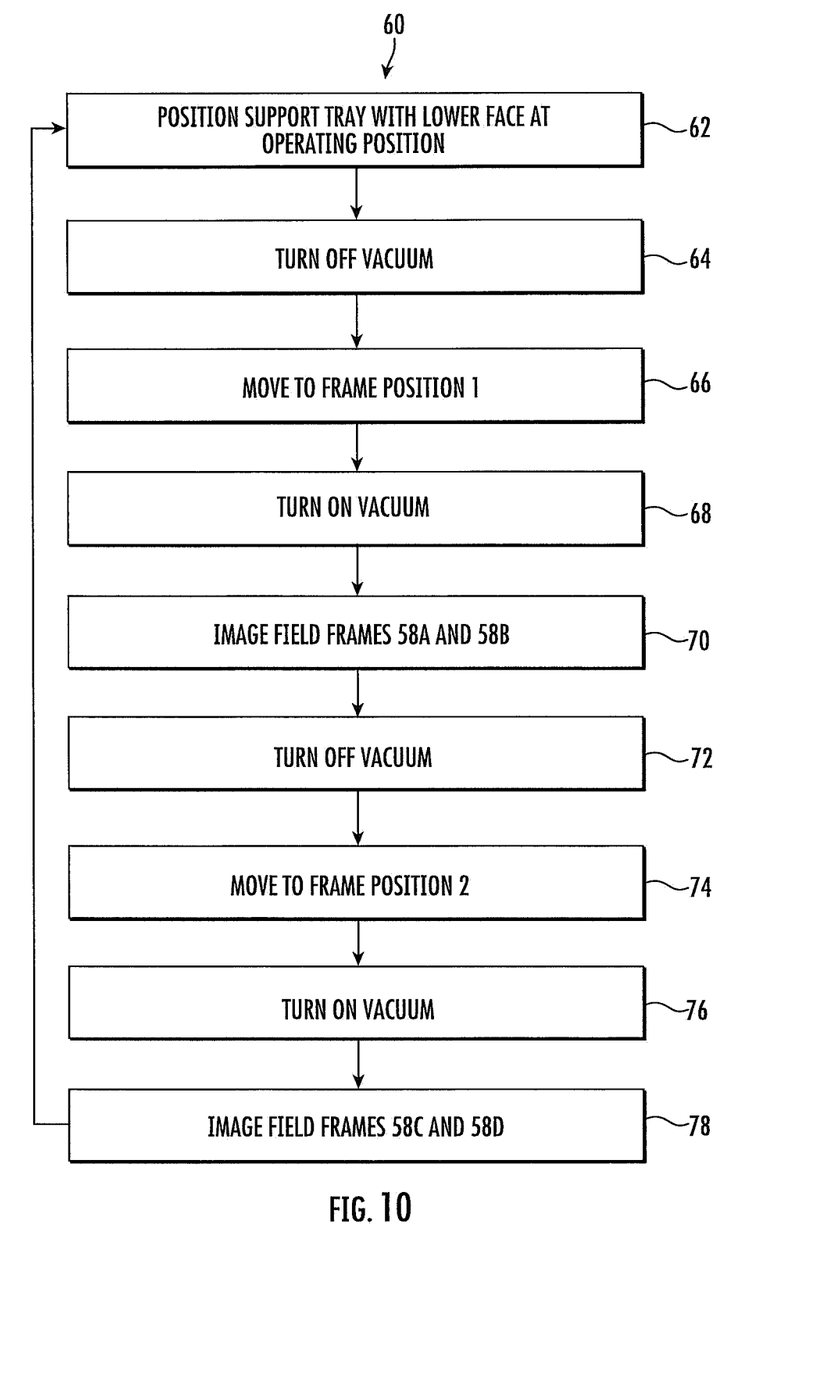
FIG. 10 is a flowchart depicting an embodiment of a method for operating the three-dimensional printing system discussed with respect to FIGS. 5-9.

FIG. 10 is a flowchart depicting an embodiment of a method 60 for operating the three-dimensional printer 2 of FIGS. 5-9. Method 60 is performed by the controller 36.

According to 62, the lower face 20 is positioned proximate to the build plane 26. According to 64, vacuum at port 56 is turned off. According to 66, the support scaffold 26 is moved to the first position as illustrated in FIG. 8. At the first position, the support scaffold 28 at least partially blocks light to build fields 58C and 58D of the build plane 26.

According to 68, the vacuum to port 56 is turned on. According to 70, light engines 22A and 22B image fields 58A and 58B respectively of the build plane 26.

According to 72, the vacuum to port 56 is turned off. According to 74, the support scaffold is moved to the second position as illustrated in FIG. 9. At the second position, the support scaffold at least partially blocks light to fields 58A and 58B of the build plane 26.

According to 76, the vacuum to port 56 is turned on. According to 78, the light engines 22C and 22D image fields 58C and 58D of the build plane 26. Steps 62-78 are repeated until the three-dimensional article 3 is fully fabricated.

In the examples above, the ridge(s) 30 are rectangular with a long axis aligned with either the X or Y axis. In other embodiments, ridges 30 can take other lateral shapes such as square, oval, circular, polygonal, irregular or elongated along an oblique axis. Ridges 30 can be used with or without a vacuum port 56.

In some embodiments, 62 includes "pumping" in which the lower face 20 is first raised and then lowered to help supply more resin 6 to the build plane 26. While the lower face 20 is being raised, the vacuum through the vacuum port 56 can be turned on to resist an upward force that the motion exerts on the transparent sheet 8.

The specific embodiments and applications thereof described above are for illustrative purposes only and do not preclude modifications and variations encompassed by the scope of the following claims.

What is claimed:

1. A system for manufacturing a three-dimensional article comprising:
    a resin vessel including an opening closed by a transparent sheet, the transparent sheet having opposed upper and lower surfaces, the upper surface for contacting resin contained in the resin vessel;
    a light engine disposed below the transparent sheet and configured to transmit radiation up through the transparent sheet, the projected radiation for selectively curing layers of the resin over a laterally extending build plane;
    a support scaffold including at least one ridge having an upper surface that contacts the lower surface of the transparent sheet to reduce an unsupported dimension, at a first lateral position the scaffold blocks the radiation from a first blocked region of the build plane while allowing the radiation to reach a first unblocked region of the build plane; and
    a positioning actuator configured to laterally move the support scaffold from the first position to a second position to allow radiation to reach the first blocked region of the build plane.

2. The system of claim 1 further comprising a movement mechanism for positioning a support tray, the support tray having a lower surface for supporting the three-dimensional article, the support tray or the three-dimensional article defining a lower face in facing relation with the upper surface of the transparent sheet.

3. The system of claim 2 wherein the contact of the upper surface of the ridge with the lower surface of the transparent sheet helps to vertically support the upper surface of the transparent sheet proximate to the build plane.

4. The system of claim 2 wherein the ridge includes a vacuum port for engaging and holding down the transparent sheet.

5. The system of claim 2 further comprising a controller controllably coupled to the light engine, the positioning actuator, and the movement mechanism.

6. The system of claim 5 wherein the controller is configured to:
    control the actuator to position the support scaffold at N different lateral positions during which the light engine is selectively curing a layer of resin; and
    control the light engine to generate N image subframes individually corresponding to the N different lateral positions, the subframes complement each other to define the selectively cured layer of resin over the build plane.

7. The system of claim 6 wherein N equals two.

8. A system for manufacturing a three-dimensional article comprising:
    a resin vessel including a lower opening closed by a transparent sheet, the transparent sheet having opposed upper and lower surfaces, the upper surface for contacting resin contained in the resin vessel;
    a movement mechanism for positioning a support tray having a lower surface for supporting the three-dimensional article, the support tray or the three-dimensional article defining a lower face;
    a light engine disposed below the transparent sheet and configured to selectively project radiation up through the transparent sheet to selectively cure layers of the resin over a build plane and onto the lower face;
    a support scaffold configured to engage the lower surface of the transparent sheet to reduce an unsupported dimension of the transparent sheet, the support scaffold including a light-blocking portion that laterally overlaps with the build plane;
    a positioning actuator coupled to the support scaffold; and
    an controller configured to:
        operate the movement mechanism to position the lower face proximate to the build plane;
        operate the positioning actuator to position the support scaffold at a first lateral position at which the light-blocking portion of the scaffold overlays a first blocked region of the build plane;

operate the light engine to generate a first image subframe that includes a first unimaged region that overlays the first blocked region of the build plane;

operate the positioning actuator to position the support scaffold at a second lateral position at which the light-blocking portion of the scaffold overlays a second blocked region of the build plane;

operate the light engine to generate a second image subframe that includes a second unimaged region that overlays the second blocked region and also images at least a portion of the first unimaged region; and further operate the movement mechanism, the positioning actuator, and the light engine until the three-dimensional article is formed.

9. The system of claim 8 wherein the controller is configured to operate the positioning actuator to position the support scaffold at N different lateral positions and to operate the light engine to generate N different image subframes that correspond to the N different lateral positions, N is greater than two.

10. The system of claim 8 wherein the second subframe images the entire first unimaged region.

11. The system of claim 8 wherein the first blocked region of the build plane includes a plurality of blocked regions of the build plane that are not contiguous, the first unimaged region includes a plurality of unimaged regions that overlay the plurality of blocked regions.

12. The system of claim 8 wherein the light engine includes a plurality of projection light engines that individually define fields that collectively define the build plane.

13. The system of claim 8 wherein the scaffold includes a ridge having an upper surface that engages the lower surface of the transparent sheet to maintain a proper spacing between the upper surface of the transparent sheet and the build plane.

14. The system of claim 13 wherein the ridge includes a vacuum port for engaging and holding down the transparent sheet.

* * * * *